(12) United States Patent
Sandstrom

(10) Patent No.: US 10,196,504 B2
(45) Date of Patent: Feb. 5, 2019

(54) TIRE WITH TREAD FOR COMBINATION OF LOW TEMPERATURE PERFORMANCE AND WET TRACTION

(71) Applicant: The Goodyear Tire & Rubber Company, Akron, OH (US)

(72) Inventor: Paul Harry Sandstrom, Cuyahoga Falls, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 148 days.

(21) Appl. No.: 15/355,742

(22) Filed: Nov. 18, 2016

(65) Prior Publication Data

US 2018/0142087 A1 May 24, 2018

(51) Int. Cl.
*C08L 9/06* (2006.01)
*B60C 1/00* (2006.01)

(52) U.S. Cl.
CPC ............ *C08L 9/06* (2013.01); *B60C 1/00* (2013.01); *B60C 1/0016* (2013.01); *C08L 2205/02* (2013.01); *C08L 2205/03* (2013.01)

(58) Field of Classification Search
CPC .... C08L 9/00; C08L 9/06; C08K 3/04; C08K 3/06; C08K 3/22; C08K 3/36; C08K 5/31; C08K 5/47; B60C 1/00; B60C 1/0016
See application file for complete search history.

(56) References Cited

U.S. PATENT DOCUMENTS

| | | | |
|---|---|---|---|
| 6,448,318 B1 | 9/2002 | Sandstrom | 524/284 |
| 9,441,098 B1 | 9/2016 | Isitman et al. | 524/526 |
| 2005/0145312 A1 | 7/2005 | Herberger, Sr. et al. | 152/151 |
| 2011/0082242 A1 | 4/2011 | Sandstrom | |
| 2013/0289183 A1 | 10/2013 | Kerns et al. | 524/313 |
| 2014/0135437 A1 | 5/2014 | Sandstrom et al. | 524/313 |

FOREIGN PATENT DOCUMENTS

EP 2412731 A1 2/2012

OTHER PUBLICATIONS

EPO search report completed Apr. 10, 2018 and dated Apr. 23, 2018.

*Primary Examiner* — Peter D. Mulcahy
(74) *Attorney, Agent, or Firm* — Henry C. Young, Jr.

(57) ABSTRACT

This invention relates to a tire with a tread for promoting all season performance, a combination of winter service at low temperatures and for promoting wet traction, while also providing good rolling resistance and resistance to treadwear performance. The tread rubber contains a combination of a high Tg styrene/butadiene elastomer, cis 1,4-polybutadiene rubber, reinforcing filler comprised of chemically pretreated precipitated silica, rubber processing oil and polyethylene glycol.

20 Claims, No Drawings

TIRE WITH TREAD FOR COMBINATION OF LOW TEMPERATURE PERFORMANCE AND WET TRACTION

This invention relates to a tire with a tread for promoting all season performance, a combination of winter service at low temperatures and for promoting wet traction, while also providing good rolling resistance and treadwear performance properties. The tread rubber contains a combination of a high Tg styrene/butadiene elastomer, cis 1,4-polybutadiene rubber, reinforcing filler comprised of pretreated precipitated silica, rubber processing oil and polyethylene glycol.

BACKGROUND OF THE INVENTION

Tires are sometimes desired with treads for promoting traction on wet surfaces. Various rubber compositions may be proposed for such tire treads.

For example, tire tread rubber compositions which contain high molecular weight, high Tg (glass transition temperature) diene based elastomer(s) might be desired for such purpose particularly for wet traction (traction of tire treads on wet road surfaces). Such tire tread may be desired where its reinforcing filler is primarily precipitated silica which may therefore be considered as being precipitated silica rich.

In one embodiment, the improved predictive wet traction performance for the tread rubber composition is based on a maximization of its tan delta physical property at about 0° C. and a desired low value for rebound at about 0° C.

However, it might also be desired to provide such tread rubber composition containing a high Tg styrene/butadiene elastomer (SBR) for wet traction with a lower stiffness at lower temperatures to promote cold weather winter performance, particularly for vehicular snow driving.

In one embodiment, the predictive cold weather performance for the tread rubber composition is based on a minimization of its stiffness physical property at about −20° C. (e.g. minimized storage modulus G').

Therefore, it is desirable to provide such vehicular tire tread with a rubber composition containing high Tg SBR elastomers with an optimized (maximized) tan delta property at about 0° C. (for predictive wet traction performance improvement) combined with an optimized (minimized) stiffness property at about −20° C. (for predictive cold weather performance improvement).

It is considered that significant challenges are presented for providing such tire tread rubber compositions that provide a combination of both wet traction and winter performance. To achieve the challenge of providing such balance of tread rubber performances with tread rubber compositions, it is recognized that concessions and adjustments would be expected. To meet such challenge, it is desired to evaluate rubber compositions with a combination of:

(A) utilizing a high Tg styrene/butadiene rubber, (B) utilizing a low Tg cis 1,4-polybutadiene rubber, (C) providing reinforcing filler containing primarily chemically pretreated precipitated silica (CTS), (chemically pretreated prior to its addition to the rubber composition, particularly pre-hydrophobated), and a minor amount of rubber reinforcing carbon black to also promote wet traction for the tire tread rubber composition, (in one embodiment, the filler reinforcement is comprised of from about 60 to about 99 percent of the CTS filler and the rubber composition is sometimes referred to as being precipitated silica rich), (D) providing polyethylene glycol to promote maintaining a higher stiffness of the rubber composition at the operating temperature range of the tire tread, particularly in a range of about 40° C. to about 60° C., particularly polyethylene glycol having an average molecular weight in a range of from about 2000 to about 6000, and (E) optionally providing a traction promoting resin.

Such CTS is provided as a precipitated silica pretreated with a silica coupler such as a bis(3-triethoxysilylpropyl) polysulfide or alkoxyorganomercaptosilane, particularly an alkoxyorganomercaptosilane.

Such rubber compositions may contain a petroleum and/or vegetable triglyceride based rubber processing oil to reduce the viscosity of the uncured rubber composition and to thereby promote more desirable processing conditions for the uncured rubber composition. In practice, a high viscosity SBR may be extended with the petroleum based oil or vegetable triglyceride oil in a sense of adding the oil to a polymerization cement containing the high viscosity SBR (e.g. high Mooney 1+4, 100° C. viscosity) following polymerization of styrene and 1,3-butadiene monomers to form a composite of oil extended SBR with the petroleum oil or vegetable triglyceride oil before the composite is added to the rubber composition in an internal rubber mixer (e.g. Banbury rubber mixer). Alternately, the petroleum based oil or vegetable triglyceride oil may be added to the rubber composition in an internal rubber mixer to reduce the viscosity of the uncured rubber composition both in the internal rubber mixer and for subsequent rubber processing in a rubber processing apparatus such as, for example, in a rubber extruder.

As indicated, it is considered that significant challenges are presented for providing such tire tread rubber compositions for maintaining a balance of wet traction, winter performance, rolling resistance and treadwear properties.

To achieve such balance of tread rubber performances with tread rubber compositions containing a combination of high Tg styrene/butadiene rubber (SBR) and low Tg cis 1,4-polybutadene rubber (PBd) based elastomers together with pretreated precipitated silica (CTS) is used to promote a reduction in the stiffness of the cured rubber composition over a wide temperature range, which is good for obtaining low stiffness at low temperatures for winter performance when used with combinations of petroleum based rubber processing oils and/or vegetable triglyceride oils, and also for obtaining a combination of good wet traction and beneficially reduced rolling resistance for a tire with tread of such rubber composition.

Such vegetable oils are generally contemplated as at least one of soybean, sunflower and rapeseed oils, particularly soybean oil.

However, while the use of the CTS has been observed to promote a desirable lower G' stiffness at about a −20° C. low temperature for the cured rubber composition, it has also been observed to promote a corresponding reduction in stiffness of the cured rubber composition at a higher intended operating temperature range (about 40° C. to about 60° C. or an even higher temperature) of the tire. Such loss of stiffness at such higher operating temperature for a tire tread rubber composition can lead to a reduction of wet and dry handling performance for the tire. The CTS in such application has also shown a loss of laboratory determined abrasion resistance, which would be predictive of worse resistance to tread wear for tire treads of such rubber compositions.

To meet such challenge of providing a precipitated silica-rich tread rubber composition containing high Tg SBR to promote wet traction and low Tg PBd to promote treadwear performance combined with promoting a reduction in its stiffness at low temperatures, but maintaining stiffness at higher operating temperature conditions, it is desired to evaluate the following approach:

(A) replacing a portion of the rubber processing oil (e.g. petroleum based oil and/or vegetable triglyceride oil) with polyethylene glycol to promote a suitable uncured rubber processing viscosity and to promote a lower cured stiffness of the tread rubber composition at lower temperatures to thereby promote low temperature winter performance for the rubber composition, while maintaining the desired stiffness at higher operating conditions for the rubber composition to thereby promote maintenance of wet and dry handling performance for the tire, (B) providing a high content of CTS precipitated silica-rich rubber reinforcing filler to promote wet traction for the cured rubber composition.

In the description of this invention, the terms "compounded" rubber compositions and "compounds" are used to refer to rubber compositions which have been compounded, or blended, with appropriate rubber compounding ingredients. The terms "rubber" and "elastomer" may be used interchangeably unless otherwise indicated. The amounts of materials are usually expressed in parts of material per 100 parts of rubber by weight (phr).

The glass transition temperature (Tg) of the solid elastomers may be determined by DSC (differential scanning calorimetry) measurements, as would be understood and well known by one having skill in such art. The softening point of a resin may be determined by ASTM E28 which might sometimes be referred to as a ring and ball softening point.

SUMMARY AND PRACTICE OF THE INVENTION

In accordance with this invention, a pneumatic tire is provided having a circumferential rubber tread intended to be ground-contacting, where said tread is a rubber composition comprised of, based on parts by weight per 100 parts by weight elastomer (phr):

(A) 100 phr of diene-based elastomers comprised of:
  (1) about 50 to about 90 phr of a styrene/butadiene elastomer having a Tg in a range of from about −35° C. to about −5° C., alternately in a range of from about −30° C. to about −10° C. (high Tg SBR),
  (2) about 10 to about 50 phr of high cis 1,4-polybutadiene rubber having a Tg in a range of from about −100° C. to about −109° C. (low Tg PBd),
  (3) optionally about 0 up to about 25, alternately a range of about 5 to about 15, phr of at least one additional diene-based elastomer,
  (4) about 10 to about 50, alternately from about 20 to about 40, phr of rubber processing oil comprised of at least one of petroleum based rubber processing oil and vegetable triglyceride oil,
  (5) about 2 to about 40 phr, alternately from about 4 to about 20 phr, of polyethylene glycol having an average molecular weight in a range of from about 2000 to about 6000, (B) about 40 to about 250, alternately from about 50 to about 175, phr of rubber reinforcing filler comprised of pretreated precipitated silica (CTS) and rubber reinforcing carbon black in a ratio of CTS to rubber reinforcing carbon black of at least 9/1, (C) optionally about 2 to 20 phr of a traction promoting resin.

In one embodiment, said high Tg SBR has a styrene content in a range of from about 5 to about 50 percent styrene.

In one embodiment, said rubber processing oil is petroleum based rubber processing oil.

In one embodiment, said rubber processing oil is vegetable triglyceride oil.

In one embodiment, said rubber processing oil is a combination of petroleum based rubber processing oil and vegetable triglyceride oil.

In one embodiment, said vegetable triglyceride oil may be comprised of, for example, at least one of soybean oil, sunflower oil, rapeseed oil and canola oil, particularly comprised of soybean oil.

While the mechanism of the inclusion of the polyethylene glycol in a sense of replacing a portion of the rubber processing oil is not clearly understood, it is apparent that it both helps to promote lower stiffness at low strain (low dynamic elongation) of the rubber composition in the lower temperature range, together with helping to maintain the desired stiffness at low strain (low dynamic elongation) at higher operating temperatures with little or no significant negative impact on other significant cured rubber properties relative to predictive wet traction, as well as resistance to treadwear and/or tear resistance properties for a tire tread.

In one embodiment, said pretreated (pre-hydrophobated) precipitated silica (CTS) is comprised of precipitated silica pre-reacted with a silica coupler comprised of bis(3-triethoxysilylpropyl) polysulfide containing an average from about 2 to about 4 connecting sulfur atoms in its polysulfidic bridge, or an alkoxyorganomercaptosilane, desirably an alkoxyorganomercaptosilane, to form a composite thereof prior to addition to said rubber composition. Such pretreated precipitated silica may also be referred to as a pre-hydrophobated precipitated silica.

In one embodiment, said rubber composition contains additional precipitated silica (non-pretreated precipitated silica) added to said rubber composition, wherein the ratio of pretreated precipitated silica (CTS) to said non-pretreated precipitated silica is desirably at least 8/1 alternately at least 10/1.

In one embodiment, the rubber composition is exclusive of addition of (added) precipitated silica to the rubber composition (thereby exclusive of addition of non-pretreated precipitated silica).

In one embodiment, said rubber composition contains silica coupler (added to said rubber composition), where said silica coupler has a moiety reactive with hydroxyl groups (e.g. silanol groups) on said pretreated precipitated silica and another different moiety interactive with said diene-based elastomers.

In one embodiment, where said rubber composition contains said added precipitated silica (in addition to said pretreated precipitated silica), said rubber composition contains added silica coupler (silica coupler added to said rubber composition), where said silica coupler has a moiety reactive with hydroxyl groups (e.g. silanol groups) on said precipitated silica and said pretreated precipitated silica and another different moiety interactive with said diene-based elastomers.

In one embodiment, said silica coupler added to said rubber composition is comprised of bis(3-triethoxysilylpropyl) polysulfide having an average of from about 2 to about 4 connecting sulfur atoms in its polysulfidic bridge.

In one embodiment, the rubber composition is exclusive of addition of silica coupler to the rubber composition (thereby exclusive of silica coupler).

As indicated, in one embodiment, the rubber composition may contain a combination of additional silica coupler added to the rubber composition, particularly a bis(3-triethoxysilylpropyl) polysulfide containing an average of from about 2 to about 4 connecting sulfur atoms in its polysulfidic bridge together with an additional precipitated silica (non-pretreated precipitated silica) added to said rubber composition, wherein the ratio of pretreated silica (CTS) to said precipitated silica is desirably at least 8/1, alternately at least 10/1.

As indicated, said tread rubber composition may contain up to 25, alternately up to about 15, phr of at least one additional diene-based elastomer. Such additional elastomer may be comprised of, for example, at least one of cis 1,4-polyisoprene, (other, additional) polybutadiene rubber, isoprene/butadiene rubber, styrene/isoprene rubber, (other, additional) styrene/butadiene rubber and may also contain 3,4-polyisoprene rubber, usually desirably cis 1,4-polyisoprene rubber and particularly desirably natural cis 1,4-polyisoprene rubber. It is intended that such additional elastomer is exclusive of isobutylene based elastomers (e.g. butyl rubber), polychloroprene rubber, and ethylene/propylene/diene rubber (e.g. EPDM).

In one embodiment, said styrene/butadiene elastomer may be a functionalized elastomer containing at least one of siloxane, amine and thiol groups or even carboxyl groups, reactive with hydroxyl groups on said precipitated silica.

In one embodiment, said styrene/butadiene elastomer and/or functionalized styrene/butadiene elastomer may be a tin or silicon coupled elastomer.

The optional traction promoting resin is desirably comprised of at least one of styrene/alphamethylstyrene resin, coumarone-indene resin, petroleum hydrocarbon resin, terpene polymer, terpene phenol resin and rosin derived resin and copolymers.

In one embodiment, the resin is a styrene/alphamethylstyrene resin. Such styrene/alphamethylstyrene resin may be, for example, a relatively short chain copolymer of styrene and alphamethylstyrene. In one embodiment, such a resin may be suitably prepared, for example, by cationic copolymerization of styrene and alphamethylstyrene in a hydrocarbon solvent. The styrene/alphamethylstyrene resin may have, for example, a styrene content in a range of from about 10 to about 90 percent. The styrene/alphamethylstyrene resin may have a softening point, for example, in a range of from about 60° C. to about 125° C., alternately from about 80° C. to about 90° C. (ASTM E28). A suitable styrene/alphamethylstyrene resin may be, for example, Resin 2336™ from Eastman or Sylvares SA85™ from Arizona Chemical having a softening point of about 80° C. to about 85° C.

In one embodiment, the resin is a coumarone-indene resin. Such coumarone-indene resin may have a softening point, for example, in a range of from about 30° C. to about 150° C. containing coumarone and indene as the monomer components making up the resin skeleton (main chain). Minor amounts of monomers other than coumarone and indene may be incorporated into the skeleton such as, for example, methyl coumarone, styrene, alphamethylstyrene, methylindene, vinyltoluene, dicyclopentadiene, cycopentadiene, and diolefins such as isoprene and piperylene.

In one embodiment, the resin is a petroleum hydrocarbon resin. Such petroleum hydrocarbon resin may be, for example, an aromatic and/or nonaromatic (e.g. paraffinic) based resin. Various petroleum resins are available. Some petroleum hydrocarbon resins have a low degree of unsaturation and high aromatic content, whereas some are highly unsaturated and yet some contain no aromatic structure at all. Differences in the resins are largely due to the olefins contained in the petroleum based feedstock from which the resins are derived. Conventional olefins for such resins include any C5 olefins (olefins and di-olefins containing an average of five carbon atoms) such as, for example, cyclopentadiene, dicyclopentadiene, isoprene and piperylene, and any C9 olefins (olefins and di-olefins containing an average of 9 carbon atoms) such as, for example, vinyltoluene and alphamethylstyrene. Such resins may be made from mixtures of such C5 and C9 olefins and di-olefins.

In one embodiment, said resin is a terpene resin. Such resin may be comprised of, for example, polymers of at least one of limonene, alpha pinene and beta pinene and having a softening point in a range of from about 60° C. to about 160° C.

In one embodiment, the resin is a terpene-phenol resin. Such terpene-phenol resin may be, for example, a copolymer of phenolic monomer with a terpene such as, for example, limonene and pinene.

In one embodiment, the resin is a resin derived from rosin and derivatives. Representative thereof are, for example, gum rosin and wood rosin. Gum rosin and wood rosin have similar compositions, although the amount of components of the rosins may vary. Such resins may be in the form of esters of rosin acids and polyols such as pentaerythritol or glycol. In one embodiment, said resin may be partially or fully hydrogenated.

In further accordance with this invention, said tire is provided being sulfur cured.

The precipitated silica reinforcement may, for example, be characterized by having a BET surface area, as measured using nitrogen gas, in the range of, for example, about 40 to about 600, and more usually in a range of about 50 to about 300 square meters per gram. The BET method of measuring surface area might be described, for example, in the *Journal of the American Chemical Society*, Volume 60, as well as ASTM D3037.

Such precipitated silicas may, for example, also be characterized by having a dibutylphthalate (DBP) absorption value, for example, in a range of about 100 to about 400, and more usually about 150 to about 300 cc/100 g.

A representative pretreated precipitated silica with silica coupler (CTS), (which may sometimes be referred to as a pre-hydrophobated precipitated silica) is, for example, Agilon™ 400 from PPG Industries. Various commercially available precipitated silicas that may be used in combination with pretreated silica may be used, such as silicas from PPG Industries under the Hi-Sil trademark with designations 210, 243, etc.; silicas from Solvay with, for example, designations of Zeosil 1165MP and Zeosil 165GR; and silicas from Evonik with, for example, designations VN2 and VN3.

Representative examples of rubber reinforcing carbon blacks are, for example and not intended to be limiting, referenced in *The Vanderbilt Rubber Handbook*, 13$^{th}$ edition, 1990, on Pages 417 and 418 with their ASTM designations. As indicated, such rubber reinforcing carbon blacks may have iodine absorptions ranging from, for example, 60 to 240 g/kg and DBP values ranging from 34 to 150 cc/100 g.

Representative of the aforesaid silica coupler (silica coupling agent) having a moiety reactive with hydroxyl groups on CTS and on precipitated silica and another moiety interactive with said diene-based elastomers may be comprised of, for example:

(A) bis(3-trialkoxysilylalkyl) polysulfide containing an average in range of from about 2 to about 4, alternatively from about 2 to about 2.6 or from about 3.2 to about 3.8, sulfur atoms in its connecting bridge, or (B) an alkoxyorganomercaptosilane, or (C) their combination.

Representative of such bis(3-trialkoxysilylalkyl) polysulfide is comprised of bis(3-triethoxysilylpropyl) polysulfide.

As indicated, for the pretreated precipitated silica, the silica coupler is desirably an alkoxyorganomercaptosilane.

For the non-pretreated precipitated silica, the silica coupler is desirably comprised of the bis(3-triethoxysilylpropyl) polysulfide.

It is readily understood by those having skill in the art that the vulcanizable rubber composition would be compounded by methods generally known in the rubber compounding art. In addition said compositions could also contain fatty acid, zinc oxide, waxes, antioxidants, antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Usually it is desired that the sulfur-vulcanizing agent is elemental sulfur. The sulfur-vulcanizing agent may be used in an amount ranging, for example, from about 0.5 to 8 phr, with a range of from 1.5 to 6 phr being often preferred. Typical amounts of processing aids comprise about 1 to about 50 phr.

As indicated, the rubber composition contains petroleum based rubber processing oil and/or vegetable triglyceride oil (e.g. comprised of at least one of soybean, sunflower, rapeseed and canola oil) together with said polyethylene glycol.

Typical amounts of antioxidants may comprise, for example, about 1 to about 5 phr thereof. Representative antioxidants may be, for example, diphenyl-p-phenylenediamine and others, such as, for example, those disclosed in *The Vanderbilt Rubber Handbook* (1978), Pages 344 through 346. Typical amounts of antiozonants may comprise, for example, about 1 to 5 phr thereof. Typical amounts of fatty acids, if used, which can include stearic acid, comprise about 0.5 to about 3 phr thereof. Typical amounts of zinc oxide may comprise, for example, about 2 to about 5 phr thereof. Typical amounts of waxes comprise about 1 to about 5 phr thereof. Often microcrystalline waxes are used. Typical amounts of peptizers, when used, may be used in amounts of, for example, about 0.1 to about 1 phr thereof. Typical peptizers may be, for example, pentachlorothiophenol and dibenzamidodiphenyl disulfide.

Sulfur vulcanization accelerators are used to control the time and/or temperature required for vulcanization and to improve the properties of the vulcanizate. In one embodiment, a single accelerator system may be used, i.e., primary accelerator. The primary accelerator(s) may be used in total amounts ranging, for example, from about 0.5 to about 4, sometimes desirably about 0.8 to about 1.5, phr. In another embodiment, combinations of a primary and a secondary accelerator might be used with the secondary accelerator being used in smaller amounts, such as, for example, from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, sulfenamides, and xanthates. Often desirably the primary accelerator is a sulfenamide. If a second accelerator is used, the secondary accelerator is often desirably a guanidine such as for example a diphenylguanidine.

The mixing of the vulcanizable rubber composition can be accomplished by methods known to those having skill in the rubber mixing art. For example, the ingredients are typically mixed in at least two stages, namely at least one non-productive stage followed by a productive mix stage. The final curatives, including sulfur-vulcanizing agents, are typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Vulcanization of the pneumatic tire containing the tire tread of the present invention is generally carried out at conventional temperatures in a range of, for example, from about 125° C. to 200° C. Often it is desired that the vulcanization is conducted at temperatures ranging from about 150° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. The parts and percentages are parts by weight, usually parts by weight per 100 parts by weight rubber (phr) unless otherwise indicated.

EXAMPLE I

Evaluation of Use of Polyethylene Glycol Together with CTS

In this example, exemplary rubber compositions for a tire tread were prepared for evaluation for use to promote wet traction and cold weather (winter) performance. A control rubber composition was prepared as Control rubber Sample A as a precipitated silica reinforced rubber composition containing a high Tg styrene/butadiene rubber (high Tg SBR) having a Tg of about −26° C. and a low Tg cis 1,4-polybutadiene rubber having a Tg of about −102° C. (low Tg PBd) together with a silica coupler for the precipitated silica reinforcement.

Experimental rubber compositions were prepared as Experimental rubber Sample B which contained a pretreated precipitated silica (CTS) and conventional petroleum based processing oil, whereas experimental Samples C and D contained the pretreated silica (CTS) and also contained an addition of 2 and 4 phr polyethylene glycol, respectively, to the rubber composition which contained the combination of high Tg styrene/butadiene rubber and low Tg cis 1,4-polybutadiene rubber.

The rubber compositions are illustrated in the following Table 1.

TABLE 1

|  | Parts by Weight (phr) | | | |
|  | Control | Experimental | | |
| Material | Sample A | Sample B | Sample C | Sample D |
| High Tg Styrene/butadiene rubber[1] | 70 | 70 | 70 | 70 |
| Low Tg Cis 1,4-polybutadiene rubber[2] | 30 | 30 | 30 | 30 |
| Petroleum based rubber processing oil[3] | 20 | 20 | 20 | 20 |
| Pretreated precipitated silica (CTS)[4] | 0 | 65 | 65 | 65 |
| Precipitated silica[5] | 65 | 0 | 0 | 0 |
| Silica coupler[6] | 5 | 0 | 0 | 0 |
| Polyethylene glycol[7] | 0 | 0 | 2 | 4 |
| Fatty acids[8] | 2 | 2 | 2 | 2 |
| Carbon black | 4 | 4 | 4 | 4 |
| Wax (microcrystalline and/or paraffinic) | 1.5 | 1.5 | 1.5 | 1.5 |
| Antioxidants | 2.8 | 2.8 | 2.8 | 2.8 |
| Zinc oxide | 1.8 | 1.8 | 1.8 | 1.8 |
| Sulfur | 1.7 | 1.7 | 1.7 | 1.7 |
| Sulfur cure accelerators[9] | 3 | 2.5 | 2.5 | 2.5 |

[1] A high Tg styrene/butadiene rubber having a Tg of about −26° C. as Sprintan 4602 ™ from Trinseo.
[2] Low Tg high cis 1,4-polybutadiene rubber as BUD1223 ™ from The Goodyear Tire & Rubber Company having a Tg of about −102° C.
[3] Rubber processing oil primarily comprised of naphthenic oil
[4] Pretreated (pre-hydrophobated) precipitated silica (CTS) as Agilon 400 ™ from PPG Industries as precipitated silica chemically treated with an alkoxyorganomercaptosilane
[5] Precipitated silica as Zeosil 1165MP ™ from Solvay
[6] Silica coupler as Si266 ™ and Si69 ™ from Evonik comprised of bis(3-triethoxysilylpropyl) polysulfide having an average of from about 2 to about 2.6 and from about 3.4 to about 3.8, respectively, connecting sulfur atoms in its polysulfidic bridge
[7] Polyethylene glycol as Pluriol E4000 from the BASF company having an average molecular weight of about 4000
[8] Fatty acids comprised of stearic, palmitic and oleic acids
[9] Sulfur cure accelerators as sulfenamide primary accelerator and diphenylguanidine secondary accelerator The rubber Samples were prepared by the same mixing procedures, wherein the elastomers and all other ingredients were added in two non-productive mixing stages and sulfur and accelerators were added in a final productive mixing stage.

The following Table 2 illustrates cure behavior and various physical properties of rubber compositions based upon the formulations of Table 1 and reported herein as Control rubber Sample A and Experimental rubber Samples B, C and D. Where cured rubber samples are reported, such as for the stress-strain, hot rebound and abrasion values, the rubber samples were cured for about 14 minutes at a temperature of about 160° C.

For Table 2, the following physical properties are reported which are used to predict tire performance:

(1) Wet traction property according to tangent delta (tan delta) at 0° C. physical property for the rubber composition. Higher laboratory values are considered to be predictive of beneficially better wet traction for a tire tread of such rubber composition.

(2) Rolling resistance property according to tangent delta (tan delta) at 60° C. for the rubber composition. Lower laboratory values are considered to indicate beneficially lower hysteresis of the rubber composition which, in turn, indicates a beneficial reduction in internal heat generation in the rubber composition and beneficial reduction in rolling resistance of the tire with a tread of such rubber composition.

(3) Treadwear resistance according to abrasion wear rate of the rubber composition, namely a Grosch abrasion wear rate. A lower Grosch abrasion rate indicates a beneficially greater treadwear resistance.

(4) Low temperature (winter snow) performance according to stiffness of the rubber composition at −20° C., namely storage modulus G' at −20° C. Lower laboratory values indicate beneficially better cold weather performance for a tire tread of such rubber composition.

(5) Wet and dry handling performance for a tire tread according to stiffness of the rubber composition at 60° C., namely storage modulus G' at 60° C. Higher laboratory values indicate beneficially better wet and dry handling performance of a tire tread of such rubber composition.

TABLE 2

|  | Parts by Weight (phr) | | | |
|  | Control | Experimental | | |
|  | Sample A | Sample B | Sample C | Sample D |
| Material |  |  |  |  |
| High Tg styrene/butadiene rubber | 70 | 70 | 70 | 70 |
| Low Tg cis 1,4-polybutadiene rubber | 30 | 30 | 30 | 30 |
| Petroleum based rubber processing oil | 20 | 20 | 20 | 20 |
| Polyethylene glycol | 0 | 0 | 2 | 4 |
| Precipitated silica | 65 | 0 | 0 | 0 |
| Pretreated precipitated silica (CTS) | 0 | 65 | 65 | 65 |
| Properties |  |  |  |  |
| Wet Traction Prediction |  |  |  |  |
| Tan delta, 10 Hz, 3% strain, 0° C. (higher values are better) | 0.20 | 0.17 | 0.19 | 0.18 |
| Rolling Resistance (RR) Prediction, |  |  |  |  |
| Tan delta, 10 Hz, 5% strain, 60° C. (lower values are desirable) | 0.15 | 0.12 | 0.11 | 0.1 |
| Treadwear Resistance Prediction |  |  |  |  |
| Grosch abrasion rate, high severity[1] (lower values are desirable) | 673 | 1258 | 800 | 751 |
| Cold Weather (Winter) Performance (Stiffness), Prediction |  |  |  |  |
| Storage modulus (G'), (MPa) at −20° C., 10 Hertz, 3% strain (lower stiffness values are desirable) | 5 | 2.3 | 2.7 | 2.3 |

TABLE 2-continued

|  | Parts by Weight (phr) | | | |
| --- | --- | --- | --- | --- |
| | Control | Experimental | | |
| | Sample A | Sample B | Sample C | Sample D |
| Wet & Dry Handling Prediction, Cured Rubber Stiffness (G' at 60° C.) | | | | |
| Storage modulus (G'), (MPa) at 60° C., 10 Hertz, 5% strain, (higher values are desirable) | 1.63 | 1.17 | 1.22 | 1.39 |

[1]The Grosch abrasion rate run on an LAT-100 Abrader and is measured in terms of mg/km of rubber abraded away. The test rubber sample is placed at a slip angle under constant load (Newtons) as it traverses a given distance on a rotating abrasive disk (disk from HB Schleifmittel GmbH). In practice, a low abrasion severity test may be run, for example, at a load of 20 newtons, 2° slip angle, disk speed of 40 km/hr for a distance of 7,500 meters; a medium abrasion severity test may be run, for example, at a load of 40 newtons, 6° slip angle, disk speed of 20 km/hr and distance of 1,000 meters and a high abrasion severity test may be run, for example, at a load of 70 newtons, 12° slip angle, disk speed of 20 km/hr for a distance of 250 meters.

From Table 2 it can be seen that, for comparative physical properties which are used to predict tire performance:
  (A) For properties of Experimental rubber Sample B in which the non-pretreated precipitated silica of Control rubber Sample A is replaced with the pretreated precipitated silica (CTS), it is observed that:
    (1) wet traction property was somewhat worse for Experimental rubber Sample B,
    (2) rolling resistance was beneficially reduced (improved) for Experimental rubber Sample B,
    (3) treadwear resistance was significantly worse for Experimental rubber Sample B,
    (4) cold weather performance (stiffness) was significantly improved for Experimental rubber Sample B, and
    (5) wet and dry handling (cured rubber stiffness) was worse for Experimental rubber Sample B.
  (B) For properties of CTS silica-containing Experimental rubber Samples C and D where polyethylene glycol was added compared to Experimental rubber Sample B without the added polyethylene glycol, it was observed that:
    (1) wet traction was somewhat improved for Experimental rubber Samples C and D,
    (2) rolling resistance was beneficially improved for Experimental rubber Samples C and D,
    (3) treadwear resistance was significantly improved for Experimental rubber Samples C and D,
    (4) cold weather performance (stiffness) was similar for Experimental rubber Samples C and D, and
    (5) wet and dry handling performance (rubber stiffness) was improved for Experimental rubber Samples C and D.

It is concluded that replacing the precipitated silica of Control rubber Sample A with pretreated precipitated silica (CTS) for Experimental rubber Sample B resulted in:
  (A) improved properties for:
    (1) rolling resistance reduction, and
    (2) cold weather performance;
  (B) worse property for:
    (1) wet traction,
    (2) treadwear resistance (significantly worse), and
    (3) wet and dry handling performance.

It is further concluded that the addition of the polyethylene glycol to the CTS containing rubber composition in Experimental rubber Samples C and D compared to Experimental rubber Sample B without the polyethylene glycol resulted in:
  (A) improved properties for:
    (1) wet traction,
    (2) rolling resistance reduction,
    (3) treadwear resistance, and
    (4) wet and dry handling performance;
  (B) similar property for cold weather performance

EXAMPLE II

Evaluation of Use of Polyethylene Glycol with Precipitated Silica without CTS

In this example, exemplary rubber compositions for a tire tread were prepared for evaluation for use to promote wet traction and cold weather (winter) performance.

A Control rubber composition was prepared as Control rubber Sample E as a non-pretreated precipitated silica reinforced rubber composition containing a high Tg styrene/butadiene rubber (high Tg SBR) having a Tg of about −26° C. and a low Tg cis 1,4-polybutadiene rubber having a Tg of about −102° C. together with a silica coupler for the precipitated silica reinforcement.

An Experimental rubber composition was prepared as Experimental rubber Sample F which contained a non-pretreated precipitated silica together (similar to Control rubber Sample E) with a silica coupler. However the petroleum oil was partially replaced with polyethylene glycol.

The rubber compositions are illustrated in the following Table 3.

TABLE 3

| | Parts by Weight (phr) | |
| --- | --- | --- |
| Material | Control Sample E | Experimental Sample F |
| High Tg styrene/butadiene rubber | 55 | 55 |
| Low Tg cis 1,4-polybutadiene rubber | 45 | 45 |
| Petroleum based rubber processing oil | 40 | 30 |
| Polyethylene glycol | 0 | 10 |
| Styrene-alphamethylstyrene resin[10] | 10 | 10 |
| Precipitated silica | 125 | 125 |
| Silica couplers | 8.8 | 8.8 |
| Fatty acids | 5 | 5 |
| Carbon black (carrier for silica coupler) | 1 | 1 |
| Wax (microcrystalline and/or paraffinic) | 1.5 | 1.5 |
| Antioxidants | 2.2 | 2.2 |
| Zinc oxide | 2.5 | 2.5 |
| Sulfur | 1.2 | 1.2 |
| Sulfur cure accelerators | 5 | 5 |

[10]Styrene-alphamethylstyrene resin as Resin 2336 ™ from Eastman Chemical

The indicated ingredients were the indicated ingredients used in Example I except for the addition of the styrene-alphamethylstyrene resin in Table 3.

The rubber Samples were prepared in the manner of Example I.

The following Table 4 illustrates cure behavior and various physical properties of rubber compositions based upon the basic formulation of Table 3 and reported herein as Control rubber Sample E and Experimental rubber Sample F. Where cured rubber samples are reported, such as for the stress-strain, hot rebound and hardness values, the rubber samples were cured for about 14 minutes at a temperature of about 160° C.

The predictive wet traction, rolling resistance, cold weather performance and wet and dry handling evaluations were conducted as in Example I (reported in Table 2 et sec).

TABLE 4

| | Parts by Weight (phr) | |
|---|---|---|
| | Control Sample E | Experimental Sample F |
| Material | | |
| High Tg Styrene/butadiene rubber | 55 | 55 |
| Low Tg Cis 1,4-polybutadiene rubber | 45 | 45 |
| Rubber processing oil | 30 | 20 |
| Polyethylene glycol | 0 | 10 |
| Precipitated silica | 125 | 125 |
| Silica coupling agents | 8.8 | 8.8 |
| Properties | | |
| Wet Traction Prediction, Laboratory | | |
| Tan delta, 0° C. (higher is better) | 0.58 | 0.49 |
| Rolling Resistance (RR) Prediction, Laboratory | | |
| Tan delta, 10 Hz, 5% strain (lower is better) | 0.228 | 0.229 |
| Cold Weather (Winter) Performance (Stiffness) Prediction, Laboratory | | |
| Storage modulus (G'), (MPa) at −20° C., 10 Hertz, 3% strain (lower stiffness values are better) | 1.58 | 32 |
| Wet and Dry Handling Prediction, Cured Rubber Stiffness | | |
| Storage modulus (G'), (MPa) at 60° C., 10 Hz, 5% strain (higher is better) | 1.6 | 2.5 |

From Table 4 it can be seen that, for comparative physical properties which are used to predict tire performance, and for properties of Experimental rubber Sample F containing the polyethylene glycol compared to properties of Control rubber Sample E without the polyethylene glycol, it is observed that (contained reinforcement as precipitated silica and silica coupler added to the rubber mixer):

(A) wet traction was similar,
(B) rolling resistance was similar,
(C) cold weather performance (cold stiffness at −20° C.) was significantly worse, and
(D) wet and dry handling performance (stiffness at 60° C.) was improved.

It is concluded that the desired challenge of achieving an all weather performance of promoting a combination of cold weather winter service and wet traction, particularly cold weather performance, was not achieved by an addition of the polyethylene glycol to the rubber composition containing the non-pretreated precipitated silica.

While the mechanism may not be fully understood, it is envisioned that the polyethylene glycol (PEG) has a significant reactive access to both of the precipitated silica (e.g. the hydroxyl groups of the precipitated silica) and the silica coupler.

In this manner PEG may possibly at least partially interact with the non-pretreated precipitated silica, as well as possibly its silica coupler, in situ within the rubber composition to thereby retard a desirable rubber reinforcing effect of the precipitated silica in a manner which was not observed for the pretreated precipitated silica (CTS) reinforcement in Example I.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a circumferential rubber tread of a rubber composition comprised of, based on parts by weight per 100 parts by weight elastomer (phr):
    (A) 100 phr of diene-based elastomers comprised of:
        (1) about 50 to about 90 phr of a styrene/butadiene elastomer having a Tg in a range of from about −30° C. to about −10° C.,
        (2) about 10 to about 50 phr of cis 1,4-polybutadiene rubber having a Tg in a range of from about −100° C. to about −109° C.,
        (3) optionally about 0 up to about 25 of at least one additional diene-based elastomer,
        (4) about 10 to about 50 phr of rubber processing oil comprised of at least one of petroleum based rubber processing oil and vegetable triglyceride oil,
        (5) about 2 to about 40 phr of polyethylene glycol having an average molecular weight in a range of from about 2000 to about 6000,
    (B) about 40 to about 250 phr of rubber reinforcing filler comprised of pretreated precipitated silica (CTS) and rubber reinforcing carbon black in a ratio of CTS to rubber reinforcing carbon black of at least 9/1,
    (C) optionally about 2 to 20 phr of a traction promoting resin.

2. The tire of claim 1 wherein said styrene/butadiene elastomer has a styrene content in a range of from about 5 to about 50 percent styrene.

3. The tire of claim 1 wherein said pretreated precipitated silica (CTS) is precipitated silica pre-reacted with a silica coupler comprised of bis(3-triethoxysilylpropyl) polysulfide containing an average of from about 2 to about 4 connecting sulfur atoms in its polysulfidic bridge or an alkoxyorganomercaptosilane.

4. The tire of claim 1 wherein said pretreated precipitated silica (CTS) is precipitated silica pre-reacted with a silica coupler comprised of an alkoxyorganomercaptosilane.

5. The tire of claim 1 wherein said rubber composition contains up to about 25 phr of said additional diene-based rubber.

6. The tire of claim 5 wherein said additional diene-based rubber is comprised of at least one of cis 1,4-polyisoprene rubber, isoprene/butadiene rubber, styrene/isoprene rubber, other polybutadiene rubber and other styrene/butadiene rubber.

7. The tire of claim 1 wherein said rubber processing oil is petroleum based rubber processing oil.

8. The tire of claim 1 wherein said rubber processing oil is vegetable triglyceride oil.

9. The tire of claim 1 wherein said rubber processing oil is a combination of petroleum based rubber processing oil and vegetable triglyceride oil.

10. The tire of claim 1 wherein said vegetable triglyceride oil is comprised of at least one of soybean oil, sunflower oil, rapeseed oil and canola oil.

11. The tire of claim 1 wherein said rubber composition contains additional precipitated silica wherein the ratio of said pretreated precipitated silica (CTS) to said additional precipitated silica is at least 8/1.

12. The tire of claim 1 wherein said rubber composition is exclusive of additional precipitated silica.

13. The tire of claim 1 wherein said rubber composition contains added silica coupler having a moiety reactive with hydroxyl groups on said pretreated precipitated silica and another different moiety interactive with said diene-based elastomers.

14. The tire of claim 11 wherein said rubber composition contains silica coupler having a moiety reactive with hydroxyl groups on said precipitated silica and said pretreated precipitated silica and another different moiety interactive with said diene-based elastomers.

15. The tire of claim 13 wherein said silica coupler is comprised of bis(3-triethoxysilylpropyl polysulfide containing an average in range of from about 2 to about 4 sulfur atoms in its connecting bridge.

16. The tire of claim 13 wherein said silica coupler is comprised of an organoalkoxymercaptosilane.

17. The tire of claim 1 wherein said styrene/butadiene elastomer is a functionalized elastomer containing at least one of siloxane, amine, thiol groups and carboxyl groups reactive with hydroxyl groups on said chemically treated precipitated silica.

18. The tire of claim 1 wherein said styrene/butadiene elastomer is comprised of a tin or silicon coupled elastomer.

19. The tire of claim 17 wherein said styrene/butadiene elastomer is comprised of a tin or silicon coupled elastomer.

20. The tire of claim 1 wherein said rubber composition contains traction promoting resin comprised of at least one of styrene/alphamethylstyrene resin, coumarone-indene resin, petroleum hydrocarbon resin, terpene polymer, terpene phenol resin and rosin derived resin and copolymers.

* * * * *